United States Patent [19]

McCoy et al.

[11] 3,890,219

[45] June 17, 1975

[54] SELECTIVE ADSORPTION OF HIGH VISCOSITY, LOW VISCOSITY INDEX COMPONENTS FROM HYDROCARBON MIXTURES

[75] Inventors: Frederic C. McCoy, Beacon; Raymond C. Schlicht, Fishkill, both of N.Y.

[73] Assignee: Texaco Inc., New York, N.Y.

[22] Filed: Jan. 2, 1974

[21] Appl. No.: 430,134

[52] U.S. Cl. .................. 208/310; 208/18; 260/708
[51] Int. Cl. ............................................ C10g 25/00
[58] Field of Search ............ 208/18, 179, 263, 300, 208/308, 310; 260/708

[56] References Cited
UNITED STATES PATENTS

| | | | |
|---|---|---|---|
| 3,216,928 | 11/1965 | Paulson............................... | 208/310 |
| 3,426,902 | 2/1969 | Kilpert et al......................... | 210/179 |
| 3,487,927 | 1/1970 | Yahnke................................ | 210/30 |
| 3,617,531 | 11/1971 | Schlicht et al...................... | 208/263 |

Primary Examiner—Herbert Levine
Attorney, Agent, or Firm—Whaley T. H.; C. G. Ries; Robert A. Kulason

[57] ABSTRACT

Separation of the relatively high viscosity, relatively low viscosity index components from hydrocarbon lubricating oil fractions through adsorption of the foregoing components on polyurethane foam to provide lubricating oils of higher viscosity index, lighter color and other improved characteristics.

22 Claims, No Drawings

SELECTIVE ADSORPTION OF HIGH VISCOSITY, LOW VISCOSITY INDEX COMPONENTS FROM HYDROCARBON MIXTURES

BACKGROUND OF INVENTION

Hydrocarbon lubricating oil fractions containing relatively high viscosity, low viscosity index, dark colored components can be improved both as to color and oxidative stability and usefulness for specific applications by removal of these components. Various means for accomplishing these results have been known heretofore, including vacuum distillation, acid treatment and percolation through solid absorbents such as Fuller's earth.

Distillation techniques have not proven uniformly practicable however because of lack of selectivity, elaborate equipment requirements, low throughput and comparatively high cost involved. Similarly, the difficulty of use, incomplete recovery, lack of adsorbent capacity, unacceptable regeneration properties, cost and the like have rendered unsatisfactory the utilization of solid absorbents in some instances.

The use of polyurethane foam has been described heretofore for removal of phenolic components from relatively low-boiling hydrocarbons in the gasoline-kerosene range, but the application of these foams to the widely disparate process of separation and recovery of low viscosity, high viscosity index lubricant oils of improved color and oxidative stability has not been suggested heretofore.

Thus, the formulation of a process to effect this recovery utilizing the foregoing foams in a highly economic separation process which avoids the difficulties alluded to with respect to other methods known heretofore to effect such recovery is believed to represent a significant advance in the relevant art.

SUMMARY OF INVENTION

It is therefore a primary object of the invention to provide a proficient separation and recovery process for treating lubricating oil fractions of petroleum hydrocarbons of materially lighter color, lower viscosity and higher viscosity index than the charge stock.

It is a particular object of this invention, as well, to provide a process for accomplishing the foregoing which is simple efficient and inexpensive.

Other objects and advantages of this invention will become evident from the following description.

Accordingly it has now been discovered that effective separation of hydrocarbon lubricating oil fractions having lower viscosities, higher viscosity indices and better color and oxidative stability can be secured by percolating a solution of the hydrocarbons, in which is incorporated a further hydrocarbon diluent, through polyurethane foam, with adsorption upon the foam of those hydrocarbon components characterized by higher viscosity, lower viscosity index and in addition, a darker, less desired coloration.

The adsorption takes place readily and regeneration is simple and complete. The adsorbent is inexpensive since it is made in vast quantities by standard commercial processes for a great number of purposes spanning a wide variety of markets, and may be reused indefinitely. Further the diluent can be readily separated from the oil when the recovery process is completed.

DESCRIPTION OF THE PREFERRED EMBODIMENTS

In accordance with the practice of the invention the higher viscosity, lower viscosity index components of a charged hydrocarbon lubricating oil fraction are separated therefrom by a process that comprises:

a. admixing with said lubricating oil fraction a saturated aliphatic, saturated cycloaliphatic or aromatic hydrocarbon solvent in a ratio by weight of solvent to oil of from 0.5 to 1 to about 10 to 1 respectively; and b. contacting the said solution with a polyurethane foam for a period of time sufficient to effect adsorption of a substantial portion of the high viscosity, low viscosity index components of said solution onto said foam.

The polyurethane foam is readily regenerated by applying thereto a low boiling polar organic solvent.

More particularly, the present invention has been found to be applicable to those lubricating oil fractions, particularly those of substantially naphthenic character, having a viscosity index of about −100 to 80 and more frequently of about −40 to 50, with a kinematic viscosity at 100°F. of between about 20 and 1000 cs. Suitable lubricating oil stocks for use in the practice of this invention are illustratively raw wax distillates, vacuum lubricating oil distillates, solvent extracts and distillate fractions thereof for example furfural extracts and unrefined naphthenic oils.

The adsorption effected results in a recovered effluent oil as indicated of lower viscosity, higher viscosity index and oxidative stability, and often, improved color. Greater color stability is secured in many instances with only a small variation in viscosity index by virtue, it is believed, of substantial removal of the oxidatively unstable aromatic components of the oil.

The hydrocarbon solvents are incorporated in the foregoing oils preferably in a volume ratio of 1:1 to 3:1, and most desirably about 2:1, respectively. The solvents are low molecular weight hydrocarbons. The preferred hydrocarbons are the saturated aliphatic hydrocarbons. Of these, those containing from about 3 to 12 carbon atoms are of use in the practice of the invention, although those containing from 3 to 8 carbon atoms are preferred. Of the saturated cycloaliphatic hydrocarbons, those containing from 3 to 8 carbon atoms are also operative. The aromatic hydrocarbons for use herein contain from 6 to 9 carbon atoms, and include the alkyl substituted derivatives thereof. Of the foregoing, pentane is particularly preferred but also looked upon as very desirable are, for example, butane, propane, hexane, heptane and octane. Other operative saturated straight chain aliphatic hydrocarbons useful herein are, for example, nonane, decane and undecane. Other illustrative solvents for use as diluents are cyclopropane, cyclohexane, cycloheptane, benzene, and the methyl-substituted derivatives thereof, for example toluene, and ortho-, meta- and paraxylene, as well as mixtures of the foregoing.

The adsorbent polyurethane may be a flexible (including high resilience types) or rigid polyester or polyether urethane foam of the so-called reticulated type described in U.S. Pat. No. 3,171,820, or of the conventional open-celled variety. Microcellular foams are operative as well. The flexible open-cell, or even more desirably the flexible reticulated polyurethane, foams are preferred. Significantly less preferred, although operative, are the substantially closed-cell types of foam. Reticulation assures a larger surface area for adsorption. In addition, polyether urethane foams with lower nitrogen content and correspondingly higher ether oxygen provide generally more effective adsorbents.

However, the foam can in any event be shredded or otherwise subdivided, by any convenient and conventional technique. A Waring blender has been found to provide a good means for shredding the foam, by way of illustration. Where the shredding of flexible foam is being undertaken, it is desirable additionally to do so at a reduced temperature, for example, 0°C. to 20°C. so that the foam will be sustained in a comparatively rigid state and thus more susceptible to comminution. A convenient means for accomplishing this is the inclusion of ice and water in the blender during the shredding operation. The size of the polyurethane particles in the shredded or comminuted state is not narrowly critical. A suitable example of mesh size range is 1 to 50 but generally a mesh size of 1 to 15, preferably about 3-4, is utilized.

Further illustrative of polyester urethane and polyether urethane foams useful in the practice of the invention, their formulation and conventional methods of preparation, are those described in Saunders, J. H. and Frisch, K. C., Polyurethanes: Chemistry and Technology I. Chemistry (High Polymers Vol. XVI), Interscience Publishers, New York, 4th Printing 1967, pages 32 to 48 inclusive, and Bruins, P. F., Polyurethane Technology, Interscience Publishers, 1969, pages 40 to 63, 78 to 86, 104 to 116.

It has been found that the polyurethane foams can, particularly where the reticulated flexible foams are utilized, absorb high viscosity, low viscosity index fractions equal to or closely approximating the weight of the foam itself. This is in favorable contrast to other solid adsorbents which are materially less effective on a comparable weight basis as well as on the basis of comparable cost.

Regeneration of the polyurethane absorbent is readily effected, as indicated above, with low-boiling polar solvents, including, for example, methyl ethyl ketone, tetrahydrofuran, diethyl ether and chlorinated hydrocarbons. Acetone is however preferred as the most efficient of these regenerative solvents. These solvents do not injure the foam and hence, as indicated above, the cycle of adsorption and regeneration can be repeated indefinitely. The solvents used both in adsorption and regeneration are very economic to use. The adsorption and regenerative processes of the invention represent therefore a considerable improvement over other solid adsorbents for additional reasons of economy as well as simplicity.

Adsorption occurs effectively within the range of about −20°C. to about 50°C. Preferred temperatures are within the range of 20°C. to 30°C., and most desirably and conveniently at about 25°C.

The separation process of the invention is conducted by passing the lubricating oil fraction in the solvent medium in a liquid phase through a column packed with the adsorbent foam. The diluted oil percolates downwardly through the packed column.

The efficiency of the adsorptive process is conveniently monitored by analysis of the recovered eluate for viscosity and viscosity index. Ultimately, the adsorbent becomes saturated to a point at which the viscosity and viscosity index of the recovered product which has passed through the adsorbent column is approximately the same as that of the charged oil, if the adsorbent is not earlier replaced. The adsorbent can of course be replaced at any time that the eluate or effluent oil passes below a certain approved minimum value for viscosity and viscosity index.

It will be apparent that the operation can be performed as a batch or continuous operation. In either event it is most convenient to effect regeneration of the foam by periodic interruption of the adsorbent process in order to contact the adsorbent foam with the regenerating solvent, most desirably, acetone, which is simply percolated through the packed column. If desired the column may be air-dried thereafter to remove any traces of solvent remaining.

The following examples are further illustrative of the invention.

EXAMPLE I

This example illustrates the practice of the invention using a charge lubricating oil having a high aromatic and naphthenic content.

Three hundred milliliters (300 ml) of an 80 percent weight overhead cut from a wax distillate furfural extract from which the most viscous, dark colored components had been removed were mixed with pentane as diluent in a volume ratio of 2:1 respectively. The mixture was charged at 77°F. (25°C.) to a glass column packed with 85 grams of open-cell, flexible polyether urethane foam having 5.5 percent nitrogen and shredded to a particle size of about 10 mesh. The column had an inside diameter of 5 centimeters and a length of about 70 centimeters. The solution of oil and solvent diluent was permitted to percolate down through the column and the effluent oil recovered in a receiving vessel at the bottom of the column. The viscosity, viscosity index and yield were determined with the results secured appearing in Table I. The residue adsorbed on the polyurethane adsorbent was removed or desorbed by allowing acetone to flow through the column. The column was air-dried to remove the acetone, at which point the column was ready for reuse. The yield of residue, its viscosity and viscosity index were determined with the results shown in Table I.

TABLE I

| Material | Yield % (Wt.) | Viscosity at 100°F,cs | Viscosity at 210°F,cs | Viscosity Index |
|---|---|---|---|---|
| Charge oil | — | 544 | 15.79 | −98 |
| Effluent oil | 76.2 | 195.6 | 10.8 | −9 |
| Residue | 23.8 | 925 | 19.20 | −148 |

It will be evident from the results recorded in Table I that the viscosity of the recovered effluent oil was materially reduced and the viscosity index increased. The pentane is removed from the effluent oil by conventional means. Viscosity index determinations in these and the following examples described herein were measured in each instance according to ASTM D2270. Viscosity in centistokes was determined in this and the following examples at 100°F. and 210°F. using ASTM D445.

EXAMPLE II

This example illustrates the effectiveness of the invention with a lubricating oil fraction similar to that of Example I but with a lower initial viscosity and higher initial viscosity index.

Three hundred milliliters (300 ml) of an 80 percent weight overhead cut from a wax distillate furfural extract having the properties indicated in Table II, mixed with 600 ml of pentane, was brought into contact with polyurethane foam in the manner described in Example I. The results secured appear in Table II.

TABLE II

| Material | Yield % (Wt.) | Viscosity at 100°F,cs | Viscosity at 210°F,cs | Viscosity Index |
|---|---|---|---|---|
| Charge oil | — | 372 | 14.4 | −42 |
| Efluent oil | 81.7 | 250 | 12.21 | −18 |
| Residue | 19.3 | 638.6 | 16.35 | −139 |

It will be evident from the results recorded in Table II that the viscosity and viscosity index of the recovered effluent oil are again materially reduced and increased, respectively.

EXAMPLE III

This example illustrates the practice of the invention in which the charged naphthenic lubricant oil fraction has a lower viscosity and higher viscosity index than the charged oils of the prior examples.

The procedure of Example I was repeated using a raw wax distillate charge oil characterized in Table III with the test results shown in this same Table III.

TABLE III

| Material | Yield % (Wt.) | Viscosity at 100°F,cs* | Viscosity at 210°F,cs | Viscosity Index |
|---|---|---|---|---|
| Charge oil | — | 90.6 | 9.18 | 80 |
| Effluent oil | 86.0 | 81.8 | 8.76 | 85 |
| Residue | 14.0 | 160.3 | 10.80 | 30 |

*extrapolated from values at 130°F. and 210°F.

Again, the effluent oil was lower in viscosity and higher in viscosity index than the charge oil. The viscosity index of the residue was particularly low in contrast to the charge stock.

EXAMPLE IV

This example illustrates the use of an unrefined dewaxed wax distillate charge oil in the practice of the invention.

The procedure of Example I was repeated using the pentane solvent as a diluent in the same proportions in admixture with an unrefined dewaxed wax distillate oil characterized in Table IV.

TABLE IV

| Material | Yield % (Wt.) | Viscosity at 100°F,cs* | Viscosity at 210°E,cs | Viscosity Index |
|---|---|---|---|---|
| Charge oil | — | 173.6 | 12.10 | 49 |
| Effluent oil | 82.0 | 153.0 | 11.41 | 54 |
| Residue | 18.0 | 292 | 14.54 | 12 |

*extrapolated from values at 130°F. and 210°F.

The improvement in viscosity index and decrease in viscosity was again evident.

EXAMPLE V

This example illustrates the comparative effectiveness of the practice of the invention as between a naphthenic pale oil and a solvent-refined paraffinic oil.

a. The practice of Example I was repeated using 200 ml of a naphthenic pale oil having the properties recited in Table V. The proportions of pentane to oil were retained at a 2:1 volume ratio but 200 ml of the oil and 400 ml of pentane were introduced into the column. The results secured are shown in Table V.

b. The practice of Example I was repeated using 500 ml of a solvent-refined paraffinic pale oil to 500 ml of pentane. The test results and properties of the effluent oil are shown in Table V.

TABLE V

| Material | Yield % (Wt.) | Viscosity at 100°F,cs | Viscosity at 210°F,cs | Viscosity Index |
|---|---|---|---|---|
| (a) | | | | |
| Naphthenic charge oil | — | 537 | 18.27 | −27 |
| Effluent oil | 79.5 | 438 | 17.02 | −13 |
| Residue | 20.5 | 799 | 20.9 | −60 |
| (b) | | | | |
| Paraffinic charge oil | — | 21.2 | 3.88 | 72 |
| Effluent oil | 83.0 | 21.0 | 3.88 | 72 |
| Residue | 17.0 | 20.5 | 3.78 | 58 |

It is evident from the foregoing test results that a higher viscosity index and lower viscosity were secured by the instant process in respect to the naphthenic oil.

EXAMPLE VI

This example illustrates the practice of the invention varying solvent-to-oil ratios.

The procedure of Example I was repeated using a charge oil in each instance as characterized in Table VI and a ratio of pentane diluent to oil as recited in connection with each of the runs 1 to 3. Three hundred milliliters of oil was employed in each instance. Consequently the amount of pentane used in each of the runs 1 to 3 was 300 ml, 600 ml and 900 ml respectively.

TABLE VI

| Material | Yield % (Wt.) | Viscosity at 100°F,cs | Viscosity at 210°F,cs | Viscosity Index |
|---|---|---|---|---|
| Run 1 | | | | |
| Diluent: Oil Ratio 1:1 | | | | |
| Charge oil | — | 632.6 | 18.40 | −62 |
| Effluent oil | 69.0 | 483.6 | 16.89 | −35 |
| Residue | 31.0 | 1224 | 21.4 | −170 |
| Run 2 | | | | |
| Diluent: Oil Ratio 2:1 | | | | |
| Charge oil | — | 632.6 | 18.40 | −62 |
| Effluent oil | 81.0 | 417 | 16.80 | −7 |
| Residue | 19.0 | 945 | 20.7 | −112 |

TABLE VI – Continued

| Material | Yield % (Wt.) | Viscosity at 100°F, cs | Viscosity at 210°F, cs | Viscosity Index |
|---|---|---|---|---|
| Run 3 | | | | |
| Diluent: Oil Ratio 3:1 | | | | |
| Charge oil | — | 632.6 | 18.40 | −62 |
| Effluent oil | 85.0 | 454 | 16.41 | −37 |
| Residue | 15.0 | Unsuitable | 25.2 | — |

It will be evident that a diluent/oil ratio of 2:1 respectively provides improved overall values for the effluent. It is noted particularly that the yield of effluent oil increased as the diluent-to-oil ratio was increased.

EXAMPLE VII

This example illustrates the use of two different diluents in the practice of the invention.

a. The procedure of Example I was repeated using 300 ml of naphthenic lubricating oil fraction as characterized in Table VII in admixture with 600 ml of pentane. The test results secured appear in Table VII as well.

b. The procedure of Example I was repeated using 300 ml of a naphthenic lubricating oil fraction as described in Table VII in admixture with 600 ml of benzene. The test results secured appear in Table VII.

TABLE VII

| Material | Yield % (Wt.) | Viscosity at 100°F, cs | Viscosity at 210°F, cs | Viscosity Index |
|---|---|---|---|---|
| (a) Diluent: | Pentane | | | |
| Charge Oil | — | 632.6 | 18.40 | −62 |
| Effluent oil | 80.8 | 413.1 | 15.88 | −27 |
| Residue | 19.2 | 945.3 | 20.7 | −112 |
| (b) Diluent: | Benzene | | | |
| Charge oil | — | 632.6 | 18.40 | −62 |
| Effluent oil | 80.9 | 465.1 | 16.23 | −44 |
| Residue | 19.1 | 965.4 | 20.1 | −100 |

It is observed that the aromatic diluent gave improved viscosity and viscosity index to the effluent oil although the use of benzene did not effect as marked an improvement in viscosity index as was secured with pentane.

Percolated oils were observed in test procedures similar to those described above to manifest better color after heating. Lower temperatures for example 10°C. as contrasted with 25°C. were also found to provide lower yields of effluent oil and somewhat lower viscosities and viscosity indices. Repercolation did not result in any appreciable change in viscosity, viscosity index or color stability.

It will be evident that the terms and expressions which have been employed are used as terms of description and not of limitation. There is no intention in the use of such terms and expressions of excluding equivalents of the features shown and described or portions thereof and it is recognized that various modifications are possible within the scope of the invention claimed.

We claim:

1. A process that comprises contacting an initial solution of diluent solvent and a hydrocarbon lubricating oil fraction with a polyurethane foam for a period of time sufficient to effect adsorption of a substantial portion of more viscous, lower viscosity index components of said lubricating oil fraction and recovering an effluent oil therefrom characterized by decreased viscosity and increased viscosity index, said diluent solvent selected from the group consisting of saturated aliphatic hydrocarbon of from 3 to 12 carbons, saturated cycloaliphatic hydrocarbon of from 3 to 8 carbons, aromatic hydrocarbon of from 6 to 9 carbons and mixtures thereof, said solvent being present in said initial solution in a ratio of solvent to oil of from 0.5 to 10:1.

2. The process in accordance with claim 1 wherein said hydrocarbon lubricating oil is paraffinic lubricating oil.

3. A process in accordance with claim 1 wherein said hydrocarbon lubricating oil is naphthenic lubricating oil.

4. The process as claimed in claim 1 wherein said hydrocarbon solvent is a saturated aliphatic hydrocarbon containing from 3 to 12 carbon atoms inclusive.

5. The process as claimed in claim 1 wherein said hydrocarbon is a saturated cycloaliphatic hydrocarbon containing from 3 to 8 carbon atoms.

6. The process as claimed in claim 1 wherein said hydrocarbon solvent is an aromatic hydrocarbon containing from about 6 to 9 carbon atoms.

7. The process of claim 6 wherein said aromatic hydrocarbon is benzene.

8. The process as claimed in claim 1 wherein the ratio of solvent to oil is from 1:1 to 3:1 respectively.

9. The process as claimed in claim 8 wherein the ratio of solvent to oil is about 2:1.

10. The process as claimed in claim 3 wherein the lubricating oil contacted with said polyurethane foam has a viscosity index of from about −100 to about 80.

11. The process as claimed in claim 10 wherein said lubricating oil contacted with said polyurethane foam has a viscosity index of from −40 to 50.

12. The process as claimed in claim 11 wherein said lubricating oil has a kinematic viscosity at 100°F. of from 1000 to 20 cs.

13. The process as claimed in claim 3 wherein said process occurs at a temperature within the range of about −20°C. to about 50°C.

14. The process as claimed in claim 13 wherein said process occurs at a temperature within the range of about 20°C. to 30°C.

15. The process of claim 14 wherein said temperature is about 25°C.

16. The process of claim 3 wherein said polyurethane foam is a polyether urethane.

17. The process of claim 3 wherein said polyurethane is a polyester urethane foam.

18. The process of claim 3 wherein said polyurethane foam is in the form of particles having a mesh size of from 1 to 50 mesh.

19. The process of claim 18 wherein said particles have a mesh size of about 1 to 15.

20. The process of claim 18 wherein the particulate foam is open-celled.

21. The process of claim 18 wherein the particulate foam is reticulated.

22. The process of claim 3 wherein said polyurethane foam is contacted with a polar organic solvent to desorb the high viscosity, low viscosity index components adsorbed by said foam therefrom.

* * * * *